United States Patent [19]

Lyberg

[11] Patent Number: 5,752,227
[45] Date of Patent: May 12, 1998

[54] METHOD AND ARRANGEMENT FOR SPEECH TO TEXT CONVERSION

[75] Inventor: Bertil Lyberg, Vagnhärad, Sweden

[73] Assignee: Telia AB, Farsta, Sweden

[21] Appl. No.: 432,062

[22] Filed: May 1, 1995

[30] Foreign Application Priority Data

May 10, 1994 [SE] Sweden .................... 9401613

[51] Int. Cl.[6] ............................ G01H 9/04
[52] U.S. Cl. .................. 704/235; 704/231; 704/251; 704/252; 704/255
[58] Field of Search .................. 395/2.44, 2.59, 395/2.64–2.66; 364/419.03

[56] References Cited

U.S. PATENT DOCUMENTS

| | | | |
|---|---|---|---|
| 3,704,345 | 11/1972 | Coker | 395/2.75 |
| 4,695,962 | 9/1987 | Goudie | 364/513.5 |
| 4,700,322 | 10/1987 | Benbassat et al. | 364/513.5 |
| 4,797,930 | 1/1989 | Goudie | 381/52 |
| 4,829,580 | 5/1989 | Church | 381/52 |
| 4,852,170 | 7/1989 | Bordeaux | 381/41 |
| 4,977,599 | 12/1990 | Bahl et al. | 381/43 |
| 5,146,405 | 9/1992 | Church | 364/419 |
| 5,220,639 | 6/1993 | Lee | 395/2 |
| 5,231,670 | 7/1993 | Goldhor et al. | 381/43 |
| 5,268,990 | 12/1993 | Cohen et al. | 395/2 |
| 5,384,701 | 1/1995 | Stentiford et al. | 364/419.03 |
| 5,546,500 | 8/1996 | Lyberg | 395/2.86 |

*Primary Examiner*—Allen R. MacDonald
*Assistant Examiner*—Michael N. Opsasnick
*Attorney, Agent, or Firm*—Oblon, Spivak, McClelland, Maier & Neustadt, P.C.

[57] ABSTRACT

The present invention relates to a method and arrangement for speech to text conversion. A string of phonemes is identified from a given input speech. The different phonemes are identified and are joined together to form words and phrases/sentences. The words are checked lexically, any words which are not found in the language concerned being excluded. The phrases/sentences are checked syntactically, any word combinations which do not occur in the language concerned being excluded. A model of the speech is obtained by the process. The intonation patterns of the model and of the input speech are determined, and compared, the words and phrases/sentences of the model, whose intonation patterns do not correspond with those of the input speech, are excluded from the model. A representation of the words, and/or word combinations, which best corresponds with the input speech is then provided, preferably in the providing in the form of a print out of the related text.

22 Claims, 2 Drawing Sheets

METHOD AND ARRANGEMENT FOR SPEECH TO TEXT CONVERSION

BACKGROUND TO THE INVENTION

The invention relates to a method and arrangement for speech to text conversion.

The invention produces a string of text from a spoken sequence and utilises the intonation pattern of the language, i.e. the modulation, or rise and fall of the pitch of the voice, for selection of words and phrases.

It is already known to use various methods for recognising speech. For example, in known speech recognition systems, speech recognition devices are trained to recognise speech from several different people, and the library of words and phrases, built up by this process, is utilised by the system for effecting the speech recognition.

Since the 1970's, it has been known in the literature to utilise fundamental tone information in speech recognition. The fundamental tone information is particularly important in languages where words can have different meanings depending on the fundamental tone curve.

However, the fundamental tone curve is not normally continuous, on account of, for example, voiceless sounds. In some voiceless sounds, such as, for example, 's', or 'p', the fundamental tone does not exist. In addition, the fundamental tone curve is greatly perturbed following certain voiceless stops, for which reason direct extraction of information from the fundamental tone curve by matching with reference patterns does not generally work.

The word stress, moreover, depends on the context in the sentence. U.S. Pat. No. 5,220,639, teaches the use of the fundamental tone to train a Hidden Markov model for five tones, and the use of statistical modulation for the recognition of syllables which can only be distinguished with the aid of tone information. This U.S. patent describes how a series of individual syllables is recognised by means of separate recognition of syllables and Mandarin tones, and combinations of recognised parts, for recognition of the individual syllables by using the Hidden Markov method. The recognised individual syllable is then used by a Markov Chinese Language model, in a linguistic decoder, for determining the corresponding Chinese character. In particular, a pitch frequency detector is used to detect characteristics relating to the pitch frequency of the unknown speech signal and the detected characteristics are fed to a personal computer which is included in the tone recognition arrangement and in which the Hidden Markov model probabilities of the five different tones are calculated. In essence, the speech signals are compared with a library, and the probability of different stresses in the individual syllables is calculated. The value of this system, in languages having polysyllabic words, is likely to be limited. Furthermore, with this system, a large library of different words and stresses has to be created and has to be accessed for each analysis. The system is, in fact, tailored not only to a particular dialect of Chinese but also to a particular person who is addressing messages to the system. Each user must, therefore, train the system with his/her voice. In addition, the system would have to be modified for each language. The scope of application of this system is, therefore, extremely limited.

Speech information transmission, using telex equipment, is covered by U.S. Pat. No. 4,489,433 wherein speech is converted to a readable character message after transmission and is primarily intended for the Japanese language. The accent in the Japanese language is a pitch accent, and it can be identified as a function of the position at the instant in time between the syllables when the pitch frequency changes abruptly to a low frequency. The word accent code indicates a sudden change in the pitch frequency and fundamental tone frequency, usually caused by the accent at a specific syllable in a word. The invention covered by U.S. Pat. No. 4,489,433 is based on the use of a number of stored templates for various word accents, and uses a comparator (see FIG. 7) which adapts a series of pulses so that Fujisaki's model is adapted to an incoming signal. Pulse sizes and positions then imply certain accents. The model is based on the idea that the pulses correspond to EMG (eletromyographic) activity in certain muscles of the larynx. It is not possible to generate the fundamental tone curve from stored templates because word accentuation changes in dependence on the context of a sentence. Furthermore, no account can be taken of the fact that the fundamental tone curve is not continuous.

In speech recognition it is desirable to find methods which can correctly recognise a spoken sequence in a simple and rapid way. One difficulty which arises, in this connection, is that of recognising words which sound alike and of distinguishing these words. A further problem is that of distinguishing the sentence stress. Sentences which are constructed using the same words, but which have different stresses, can acquire different meanings in different languages. A further requirement is that it should be possible for the method to be used by any speaker, without it having to be tailored to the speaker in question.

In U.S. Pat. No. 5,220,639 it is stated that the system described therein has been tailored to the user who is addressing messages to the system. Each user who is to utilise the system must, therefore, train the system with his/her voice. It is also stated that the invention is tailored only to a particular dialect of Chinese. Should the invention be used for other languages, then the model must be modified for each language.

There is, therefore, a need to find methods which can be generally applied in different languages. Such language-independent methods are not described in, nor taught by, U.S. Pat. No. 5,220,639. As stated above, U.S. Pat. No. 4,489,433 which covers speech information transmission using telex equipment, is concerned with speech recognition of the Japanese language only and no account is taken of the fact that the fundamental tone curve is not continuous. As stated above, in voiceless sounds there is no tone curve. Thus, the direct extraction of information from the fundamental tone curve, by matching with reference patterns, does not generally work, because the fundamental tone curve is greatly perturbed following certain voiceless stops.

Furthermore, word accentuation depends, to a large extent, on the context of the sentence. It is very difficult to formulate general methods which can be applied in solutions of the type referred to above.

It is an object of the present invention to overcome the problems, outlined above, by the provision of a method and arrangement, for the conversion of speech to text, which utilises intonation patterns, i.e. the modulation, or rise and fall in pitch of, the voice, as a means of recognising speech in a simple and rapid way.

SUMMARY OF THE INVENTION

The present invention provides a method for speech to text conversion, characterised by the steps of identifying a number of phonemes from a segment of input speech to be converted into text; interpreting the phonemes as possible words, or word combinations, to establish a model of the speech; determining the intonation pattern of the fundamental tone of the speech model and thereby the maximum and minimum values of the fundamental tone, and their respective positions; determining the fundamental tone of the input speech; determining the intonation pattern of the fundamental tone of the input speech and thereby the maximum and minimum values of the fundamental tone, and their respective positions; comparing the intonation patterns of the input speech and the speech model to identify those words, and word combinations, in the speech model, having intonation patterns which best correspond with the intonation patterns of the corresponding words, and word combinations, of the input speech; and providing a representation of the words, and/or word combinations, which best corresponds with the input speech. The representation of the words, and/or word combinations, from which the speech model is formed, may be in the form of a print out of the related text. The identification of a number of phonemes from the input speech may be effected using a Hidden Markov model.

In accordance with the method according to the present invention, the identified phonemes are combined into allophone strings, the established speech model including different sounds, or sound combinations, and unpronounced parts of the words.

With the method according to the present invention, the words in the speech model are checked lexically, the phrases in the speech model are checked syntactically, and the words and phrases which are not linguistically possible, are excluded from the speech model. The orthography and transcription of the words in the speech model are also checked.

The method according to the present invention is adapted to distinguish the meaning of words which sound alike but have different stresses, and to identify the phrases whose meaning changes in dependence upon the sentence stress.

The method according to the present invention is further adapted to identify phonemes occurring in different languages, without training, and to exclude phonemes which do not exist in a particular language.

The present invention also provides an arrangement for speech to text conversion, characterised in that the arrangement includes speech recognition means for identifying a number of phonemes from a segment of input speech to converted into text; word-interpretation means for interpreting the phonemes as possible words, or word combinations, to establish a model of the speech; first analysing means for determining the intonation pattern of the fundamental tone of the speech model and thereby the maximum and minimum values of the fundamental tone, and their respective positions; extraction means for extracting the fundamental tone from the input speech; second analysing means for determining the intonation pattern of the fundamental tone of the input speech and thereby the maximum and minimum values of the fundamental tone, and their respective positions; comparison means for comparing the intonation patterns of the input speech and the speech model to identify those words, and word combinations, in the speech model, having intonation patterns which best correspond with the intonation pattern of the corresponding words, and word combinations, of the input speech; and text selection means for selecting, and providing a representation of, the words, and/or word combinations, which best correspond with the input speech. The text selection means may include a printer for providing a print out of the words, and/or word combinations, which best correspond with the input speech. The identification of a number of phonemes from the input speech may be effected using a Hidden Markov model.

In a preferred arrangement for speech to text conversion, the phonemes are combined into allophone strings by the speech recognition means, and the speech model, established by the word-interpretation means, includes different sounds, or sound combinations, and unpronounced parts of the words.

The arrangement for speech to text conversion, according to the present invention, may also include checking means for lexically checking the words in the speech model and for syntactically checking the phrases in the speech model, the words and phrases which are not linguistically possible being excluded from the speech model. In a preferred arrangement, the checking means check the orthography and transcription of the words in the speech model.

The comparison means of the arrangement according to the present invention may be adapted to distinguish the meaning of words which sound alike but have different stresses. The phrases, whose meaning changes in dependence upon the sentence stress, may also be distinguished by the comparison means.

The speech recognition means of the arrangement according to the present invention are adapted to identify phonemes occurring in different languages, without training, and to exclude phonemes which do not exist in a particular language.

The present invention further provides a system responsive to spoken words including an arrangement for speech to text conversion, as outlined in the preceding paragraphs, or operating in accordance with the method for speech to text conversion, as outlined in the preceding paragraphs. The system may include a voice-responsive word processing unit for the production of textual information from spoken words. The system may be, or form part of, a telecommunication system, for example, a system including voice-responsive telex apparatus.

Thus, the arrangement and method according to the present invention has the advantage of being able to distinguish the meaning of different words, as a function of stress. The present invention can, moreover, differentiate the meaning of sentences, as a function of sentence stresses. The manner in which the fundamental tone information is utilised by the arrangement and method according to the present invention, has not previously been demonstrated. The use of fundamental tone information makes it possible to exclude words and phrases which, on the one hand, do not exist in the language in question and which, on the other hand, do not agree with the stresses which occur in the segment of input speech to be converted into text. This affords unique possibilities of identifying the speech correctly. The identification of different phonemes, by the speech recognition means, facilitates the identification of possible word and phrase constructions for the speech model. This information is then used to find, on a lexical and syntactical basis, words and phrases which are possible in the input speech. The present invention identifies different words and phrases as a function of the stress positions, without the need to store a number of words and phrases, which are identical but which have different stresses. Thus, the possibility of identifying the actual meaning of the words and phrases increases considerably with the present invention. Also, with the present invention a considerably shorter time is required for the identification of words and phrases. Furthermore, the increased possibility of identifying the speech correctly, also lessens the risk of incorrect interpretations which could have disastrous consequences.

The arrangement and method according to the present invention is also adapted to receive normal speech, and does not, as is the case, for example, with the invention covered by U.S. Pat. No. 5,220,639, require the syllables to be enunciated individually.

In known systems, see for example, U.S. 5,220,639, a number of words are programmed into the system. The system is also tailored to a number of speakers who are assumed to input the information into the system. With the present invention it is possible for any speaker, at random, to input speech information, without the system being tailored to the person concerned. The method and arrangement of the present invention can also be programmed for all known phonemes occurring in different languages. Also, phonemes which do not exist in a specific language can be excluded. This means that application of the present invention is extremely flexible.

With the invention of U.S. Pat. No. 5,220,639, for example, a number of statistical models are programmed, the models are compared with the speech and the model which best corresponds with the speech is selected. Thus, unlike the present invention, known systems, of this type, do not take account of word, or sentence, stresses. Incorrect meanings of words and phrases can, therefore, occur with known systems.

The foregoing and other features, according to the present invention, will be better understood from the following description with reference to the accompanying drawings, in which:

Figure 2:
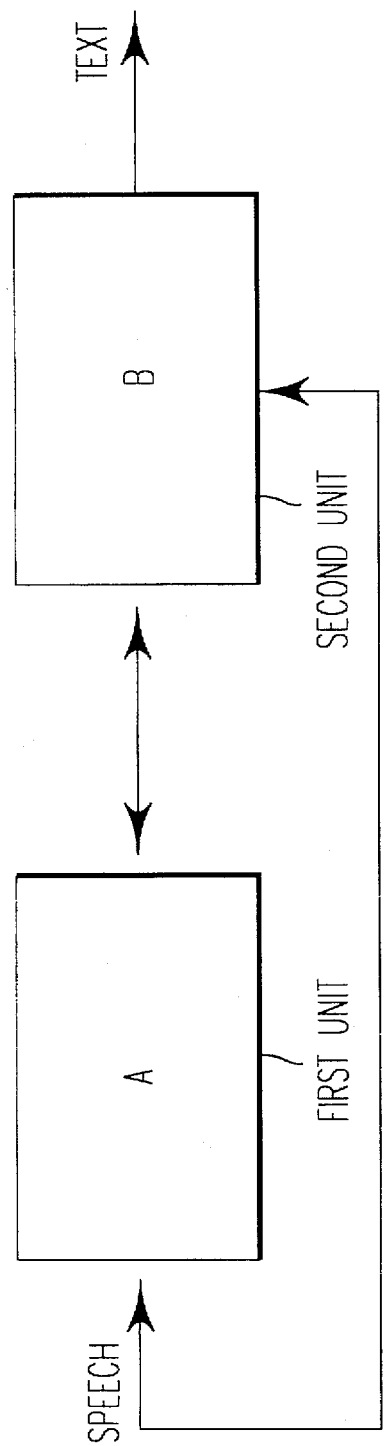
FIG. 2 diagrammatically illustrates a speech to text conversion arrangement, according to the present invention, in the form of a simplified block diagram.

A simplified block diagram of a speech to text conversion arrangement, according to the present invention, is diagrammatically illustrated in FIG. 2 of the drawings and includes a first unit A, to the input of which is applied a segment of input speech to be converted into text. The segment of input speech is also connected to an input of a second unit B. The output of the first unit A is connected to another input of the second unit B, the output of which is a text which is in correspondence with the input speech, i.e. in accordance with the present invention, a speech model having intonation patterns which best correspond with the intonation patterns of the corresponding words, and word combinations, of the input speech is, in a manner to be subsequently outlined, printed out in the form of a text from the second unit B.

The segment of input speech applied to the input of the first unit A is recognised as a number of phonemes. The unit A is adapted to interpret the phonemes as possible words, or word combinations, to establish a model of the speech. The intonation pattern of the fundamental tone of the model and thereby the maximum and minimum values of the fundamental tone, and their respective positions, are determined. The intonation pattern of the fundamental tone of the input speech and thereby the maximum and minimum values of the fundamental tone, and their respective positions, are extracted by the unit B. The extracted intonation patterns of the input speech are compared with the intonation patterns of the model. Words and word combinations, or sentences, in the model, which do not correspond with the intonation patterns of the input speech, are then excluded from the speech model. A word interpretation is also carried out by the unit A. In essence, the word-interpretation effected by the unit A, deciphers alternative phonemes and/or phonemes which have not been pronounced. The end result of this word-interpretation process is a number of possible interpretations of the speech model. The possible words, forming part of the speech model, are also checked, during the word-interpretation process, against a lexicon, i.e. a dictionary, with orthography and transcription. The words which do not exist, in the language in question, are excluded. The syntax, i.e. grammatical structure, of the possible phrases/sentences, forming part of the speech model, are also checked, during the word-interpretation process, in order to exclude those phrases/sentences which conflict with the rules of the language concerned. Furthermore, the meaning of those words and phrases which are stress-dependent is determined by the second unit B. Finally, the second unit B produces, in the form of a print out, a text which corresponds with the input speech.

Figure 1:
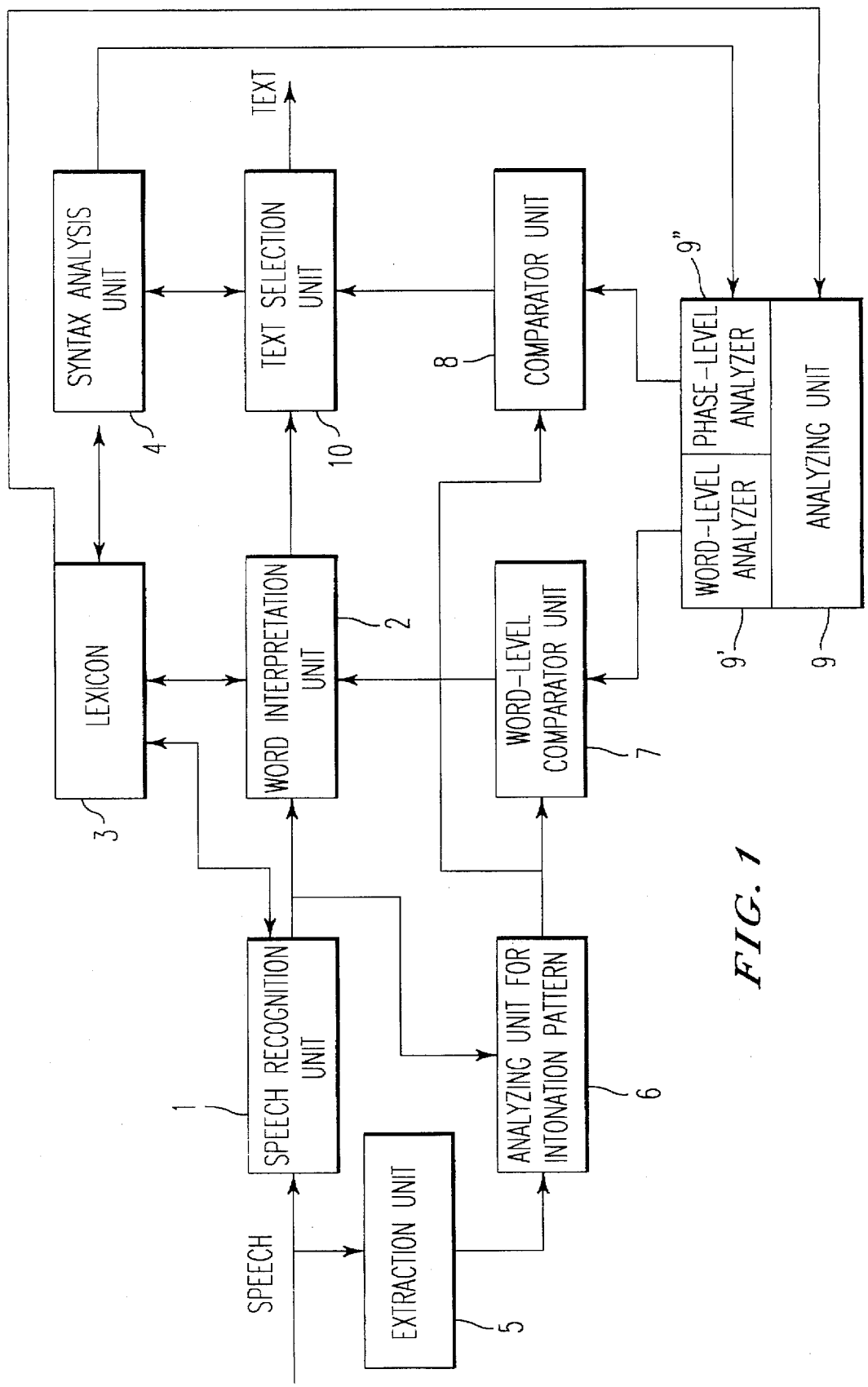
FIG. 1 diagrammatically illustrates, in the form of a block diagram, a speech to text conversion arrangement, according to the present invention.

The detailed manner in which the speech to text conversion, outlined above with respect to FIG. 2 of the drawings, is effected by the arrangement, according to the present invention, is diagrammatically illustrates, in the form of a block diagram, in FIG. 1 of the accompanying drawings.

As illustrated in FIG. 1, a segment of input speech to be converted into text is applied, in parallel, to a speech recognition unit 1 and to an extraction unit 5, in which the fundamental tone of the input speech is extracted. The speech recognition unit 1 which operates in a known manner, for example, by using a Hidden Markov model, or an equivalent model, identifies a number of phonemes from the input speech which are combined into allophone strings i.e. one of two, or more, forms of the same phoneme. The allophone strings, at the output of the speech recognition unit 1, are applied to the input of a word-interpretation unit 2, wherein the phonemes are interpreted as possible words, or word combinations, for the establishment of a word model of the input speech. The possible words, and word combinations, i.e. phrases, are applied to a lexicon 3, i.e. a dictionary, with orthography and transcription, wherein the words are checked lexically. Any of the possible words which do not exist in the language concerned, are excluded. The word model of the speech which is established by this process and which is formed from different sounds, or sound combinations, and unpronounced parts of the words, is applied to the speech recognition unit 1 and to an analysing unit 9 which is adapted to determine the intonation pattern of the fundamental tone of the model, and thereby the maximum and minimum values of the fundamental tone, and their respective positions. The maximum and minimum values of the fundamental tone, and their relative positions, provide a description of the intonation of the possible words from which the model is formed. The word-level intonation pattern, formed from the lexically produced information by the analysing unit 9, is applied to a comparator unit 7 via a word-level section 9' of the analysing unit 9.

The speech recognition unit 1 determines, from the word model applied thereto by the lexicon 3, whether the word, or words, concerned correspond(s) with the corresponding sound(s) of the input speech.

The fundamental tone extracted from the input speech by the extraction unit 5 is applied to an analysing unit 6, as is the output of the speech recognition unit 1, i.e. the allophone strings, applied to the word-interpretation unit 2, are also applied to the analysing unit 6. The analysing unit 6 is adapted to determine the intonation pattern of the fundamental tone of the input speech and thereby the maximum and minimum values of the fundamental tone, and their respective positions. The application of the output of the speech recognition unit 1 to the analysing unit 6 enables the positions, in the allophone strings, of the maximum and minimum values of the intonation pattern to be determined. As stated above, the maximum and minimum values of the fundamental tone, and their relative positions, provide a description of the intonation of the words and phrases of the input speech. This description is applied, as illustrated in FIG. 1, to the comparator unit 7 and to a comparator unit 8.

The comparator unit 7 is adapted to effect a comparison, at word-level, between intonation patterns of the input speech and the word model. Words in the model having an intonation pattern which does not correspond with the intonation pattern of the speech are excluded. The exclusions are reported to the word-interpretation unit 2 which then continues with the word-interpretation process, in association with the lexicon 3, with the remaining words and to combine these words into phrases.

The phrase models resulting from this process, i.e. at the output of the lexicon 3, are checked by a syntax analysis unit 4. The phrase models, whose syntax does not correspond with the language concerned, are excluded during this syntax check. Information on the excluded phrases is fed back to the lexicon 3. On receipt of this information, the lexicon 3 sends new phrase model proposals to the syntax analysis unit 4 for further processing. Phrases which are possible per se in the language concerned, i.e. the phrases which are found to be acceptable by the syntax analysis unit 4, are transmitted to the analysing unit 9, where a description of the intonation pattern of the fundamental tone curve, i.e. the maximum and minimum values of the curve, and their relative positions, is obtained. The intonation pattern description is transmitted to the analysing unit 9, and from there to the comparator unit 8 via a phrase-level section 9" of the analysing unit 9.

The comparator unit 8 compares the sentence stresses of the phrase models with the stresses which have been detected in the fundamental tone curve of the input speech. The phrase models, having an intonation pattern which does not correspond with the intonation pattern of the speech, are excluded. Information on the excluded phrases is transmitted from the comparator unit 8 to a text selection unit 10, the input of which is connected to an output of the word-interpretation unit 2, i.e. text strings at the output of the word-interpretation unit 2 are applied to the input of the text selection unit 10. As illustrated in FIG. 1, the strings of text generated by the syntax analysis 4 are also applied to the text selection unit 10.

The text selection unit 10 compares the strings of text from the word-interpreting unit 2 with the strings of text generated by the syntax analysis 4. As a result of this interpretation process, a text is produced, at the output of the text selection unit 10, which is in correspondence with the input speech.

Thus, the output of the text selection unit 10 is a speech model, having intonation patterns which best correspond with the intonation patterns of the corresponding words, and word combinations, of the input speech. The speech model output of the text selection unit 10 is preferably in the form of a print out of the words, and/or word combinations, from which the speech model is formed. The output of the text selection unit 10 may be represented in other forms, for example, the words, and/or word combinations, may be presented in the form of a visual display.

Since the method and arrangement for speech to text conversion, according to the present, utilises the maximum and minimum values of the fundamental tone curve, and their relative positions, i.e. intonation patterns, as a means of recognising speech, in a simple and rapid way, the invention according to the present invention is a significant advance on the state of the art. The prior art does not teach, nor suggest, the use of the intonation pattern of the language as a means of recognising speech.

The use of intonation patterns, as part of the speech recognition process, has the advantage that the meaning of different words and sentences can be distinguished as a function of stress. This is of significance because sentences which are constructed using the same words, but which have different stresses, can acquire different meanings in different languages. This use of the fundamental tone information which, as stated above, has not previously been demonstrated by persons skilled in the art, makes it possible to effect correct identification of speech in a simple, quick and efficient manner. Another significant difference between the prior art, and the present invention, is that the method and apparatus for speech to text conversion of the present invention does not have to be tailored to a particular speaker and can, therefore, be used, without specific training, by any speaker. Furthermore, since the present invention can be programmed for all known phonemes occurring in different languages, and specifically exclude phonemes which do not exist in a particular language, it is extremely flexible in its application. These differences between the present invention and the prior art are of practical/technical significance and, therefore, give rise to distinct advantages when used in speech to text conversion systems.

The fact that the present invention can be applied in different languages, and can correctly identify speech in a simple, quick and efficient manner, for translation into text, increases its technical and commercial importance in relation to known speech to text conversion systems.

It will be directly evident to persons skilled in the art that the present invention could be used in many applications. In particular, the invention could find application in systems which are responsive to spoken words, for example, telecommunication systems, or a voice-responsive computer systems.

In the telecommunication context, the voice-responsive system could form, at least part of, a telecommunication system, for example, voice-responsive telex apparatus wherein the keyboard inputs would be replaced by spoken words and wherein the spoken words would then be translated to the corresponding text for transmission to the intended recipient(s).

In voice-responsive computer applications, for example, word processing systems, which respond to spoken instructions, the text resulting from the voice recognition system could be used for a multiplicity of applications. In particular, the production of reports, or text messages, or translation into another language using language conversion technology. Other possible applications for the present invention, are educational/language training systems.

The invention is not limited to the embodiment outlined above, but can be modified within the scope of the appended patent claims and the inventive concept.

We claim:

1. A method for speech to text conversion including the steps of:
   identifying phonemes from a segment of input speech to be converted into text;
   interpreting the phonemes as possible word combinations to establish a speech model of the segment of input speech;

determining a first intonation pattern of a first fundamental tone of the speech model including first maximum and minimum values of the first fundamental tone, and respective positions of the first maximum and minimum values;

determining a second fundamental tone of the input speech;

determining a second intonation pattern of the second fundamental tone of the input speech including second maximum and minimum values of the second fundamental tone, and respective positions of the second maximum and minimum values;

comparing the second and first intonation patterns of the input speech and the speech model, respectively, to identify the word combinations in the speech model having intonation patterns which best correspond with the second intonation pattern of the word combinations of the input speech; and providing a representation of the at least one of corresponding words and word combinations which best correspond with the input speech.

2. A method as claimed in claim 1, wherein the representation of the word combinations, from which the speech model is formed, is in print out form.

3. A method as claimed in claim 1, wherein the step of identifying phonemes comprises the step of combining the phonemes into allophone strings, and wherein the step of interpreting the phonemes comprises the step of establishing the speech model using the allophone strings which include at least one of different sounds, sound combinations, and unpronounced parts of the word combinations.

4. A method as claimed in claim 1, wherein the step of identifying phonemes comprises the step of combining the phonemes into allophone strings, and wherein the step of interpreting the phonemes comprises the steps of:
establishing the speech model from the allophone strings,
checking the words in the speech model lexically,
checking phrases in the speech model syntactically, and
excluding words and phrases which are not linguistically possible from the speech model.

5. A method as claimed in claim 4, wherein the step of interpreting further comprises the step of checking spelling and transcription of the word combinations in the speech model.

6. A method as claimed in claim 1, further comprising the steps of:
distinguishing the meaning of words which sound alike but have different stresses, and
identifying phrases whose meanings change in dependence upon sentence stress.

7. A method as claimed in claim 1, wherein the step of identifying phonemes comprises the step of combining the phonemes into allophone strings, and wherein the step of interpreting the phonemes comprises the steps of:
establishing the speech model from the allophone strings,
checking the words in the speech model lexically,
checking spelling and transcription of the words in the speech model,
checking phrases in the speech model syntactically,
excluding words and phrases which are not linguistically possible from the speech model,
distinguishing meanings of words which sound alike but have different stresses, and
identifying phrases whose meanings change in dependence upon the sentence stress.

8. A method as claimed in claim 1, wherein the step of identifying phonemes comprises the steps of:
identifying phonemes occurring in different languages without training, and
excluding phonemes which do not exist in a particular language.

9. A method as claimed in claim 1, wherein the step of identifying the phonemes comprises identifying the phonemes from the input speech using a Hidden Markov model.

10. An arrangement for speech to text conversion comprising:

speech recognition means for identifying phonemes from a segment of input speech to be converted into text;

word-interpretation means for interpreting the phonemes as possible word combinations to establish a speech model of the segment of input speech;

first analysing means for determining a first intonation pattern of a first fundamental tone of the speech model including first maximum and minimum values of the first fundamental tone, and respective positions of the first maximum and minimum values;

extraction means for extracting a second fundamental tone, and respective positions of second maximum and minimum values;

comparison means for comparing the second and first intonation patterns of the input speech and the speech model, respectively, to identify the word combinations in the speech model having intonation patterns which best correspond with the second intonation pattern of word combinations of the input speech.

11. An arrangement as claimed in claim 10, wherein the text selection means comprises a printer for providing a print out of the word combinations which best correspond with the input speech.

12. An arrangement as claimed in claim 10, wherein the speech recognition means comprises means for combining the phonemes into allophone strings, and wherein the word-interpretation means comprises means for establishing the speech model using at least one of different sounds, sound combinations, and unpronounced parts of the word combinations.

13. An arrangement as claimed in claim 10, further comprising:
checking means for lexically checking words in the speech model, for syntactically checking words in the speech model and for syntactically checking phrases in the speech model, and
excluding means for excluding from the speech model words and phrases which are not linguistically possible.

14. An arrangement as claimed in claim 13, wherein the checking means further comprises for checking spelling and transcription of words in the speech model.

15. An arrangement as claimed in claim 10, wherein the comparison means comprises:
means adapted to distinguish meanings of words which sound alike but have different stresses, and
means for distinguishing phrases, whose meanings change in dependence upon sentence stress.

16. An arrangement as claimed in claim 10, further comprising checking means for lexically checking words in the speech model by checking spelling and transcription of the words in the speech model, and for syntactically checking phrases in the speech model, means for excluding from the speech model words and phrases which are not linguistically possible, and wherein the comparison means comprises:

means to distinguish meanings of words which sound alike but have different stresses, and means to distinguish phrases whose meanings change in dependence upon sentence stress.

17. An arrangement as claimed in claim 10, wherein the speech recognition means comprises means adapted to identify phonemes occurring in different languages, without training, to exclude phonemes which do not exist in a particular language.

18. An arrangement as claimed in claim 10, wherein the speech recognition means comprises means for identifying the phonemes from the input speech using a Hidden Markov model.

19. A system responsive to spoken words including an arrangement as claimed in claim 10, or operating in accordance with the method as claimed in claim 1.

20. A system as claimed in claim 19, wherein the system includes a voice-responsive word processing unit for the production of textual information from spoken words.

21. A system as claimed in claim 19, further comprising a voice-responsive telex apparatus.

22. A system as claimed in claim 19, further comprising means for transmitting words via a telecommunications device.

* * * * *